(12) United States Patent
Millhaem et al.

(10) Patent No.: US 11,536,198 B2
(45) Date of Patent: Dec. 27, 2022

(54) GAS TURBINE ENGINE COOLING SYSTEM CONTROL

(71) Applicant: General Electric Company, Schenectady, NY (US)

(72) Inventors: Michael Robert Millhaem, Cincinnati, OH (US); Christopher R. Bosco, Gaithersburg, MD (US); Gerardo Perez, Queretaro (MX); Hejie Li, Mason, OH (US); Francisco Ernesto de la Pena, Queretaro (MX); Alejandro Federico Medrano Perez, Queretaro (MX); Andrew Campbell, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/379,261

(22) Filed: Jul. 19, 2021

(65) Prior Publication Data

US 2022/0235707 A1 Jul. 28, 2022

Related U.S. Application Data

(63) Continuation of application No. 17/160,742, filed on Jan. 28, 2021.

(51) Int. Cl.
*F02C 7/18* (2006.01)
*F01D 25/12* (2006.01)
(Continued)

(52) U.S. Cl.
CPC ............... *F02C 7/18* (2013.01); *F01D 25/12* (2013.01); *F01D 21/12* (2013.01); *F02C 9/18* (2013.01);
(Continued)

(58) Field of Classification Search
CPC .......... F02C 7/18; F02C 9/18; F02C 7/12–18; F01D 25/12; F01D 21/12; F01D 21/20;
(Continued)

(56) References Cited

U.S. PATENT DOCUMENTS 2,031,541 A 2/1936 Macclain
2,970,436 A 2/1961 Sims, Jr.
(Continued)

FOREIGN PATENT DOCUMENTS

EP 1884628 A2 2/2008
EP 2442195 A2 4/2012
(Continued)

*Primary Examiner* — Gerald L Sung
*Assistant Examiner* — Rene D Ford
(74) *Attorney, Agent, or Firm* — Dority & Manning, P.A.

(57) ABSTRACT

A gas turbine engine includes a core cowl and a core contained within the core cowl. The core includes a compressor in fluid communication with a downstream combustor and a downstream turbine, the compressor including a compressor bleed port, wherein an undercowl space is defined between the core cowl and the core. The gas turbine engine further includes a cooling duct disposed at least partially in the undercowl space and having an inlet and an outlet, wherein the cooling duct is in fluid communication with a source of cooling air and is further in fluid communication with the compressor bleed port; a valve assembly including at least one valve disposed in the cooling duct; and a cooling blower disposed within the engine and operable to move an air flow from the inlet of the cooling duct towards the outlet of the cooling duct and through the compressor bleed port.

20 Claims, 6 Drawing Sheets

(51) Int. Cl.
*F02C 9/18* (2006.01)
*F01D 21/12* (2006.01)

(52) U.S. Cl.
CPC .... *F05D 2220/323* (2013.01); *F05D 2220/50* (2013.01); *F05D 2240/35* (2013.01); *F05D 2260/20* (2013.01); *F05D 2270/303* (2013.01); *F05D 2270/304* (2013.01); *F05D 2270/3032* (2013.01)

(58) Field of Classification Search
CPC ....... F05D 2270/303; F05D 2270/3032; F05D 2220/323; F05D 2220/50; F05D 2240/35; F05D 2260/20; F05D 2270/304
See application file for complete search history.

(56) References Cited

U.S. PATENT DOCUMENTS

| | | | |
|---|---|---|---|
| 4,474,001 | A | 10/1984 | Griffin et al. |
| 5,012,639 | A | 5/1991 | Ream et al. |
| 5,123,242 | A | 6/1992 | Miller |
| 5,127,222 | A | 7/1992 | Ream et al. |
| 6,134,880 | A | 10/2000 | Yoshinaka |
| 6,202,403 | B1 | 3/2001 | Laborie |
| 6,305,156 | B1 | 10/2001 | Lui |
| 7,329,084 | B2 | 2/2008 | Dittmann |
| 7,766,610 | B2 | 8/2010 | Busekros |
| 7,823,374 | B2 | 11/2010 | Venkataramani et al. |
| 7,845,159 | B2 | 12/2010 | Venkataramani et al. |
| 7,900,437 | B2 | 3/2011 | Venkataramani et al. |
| 8,015,788 | B2 | 9/2011 | Stephenson et al. |
| 8,069,827 | B2 | 12/2011 | Watanabe et al. |
| 8,210,801 | B2 | 7/2012 | Ballard, Jr. et al. |
| 8,395,275 | B2 | 3/2013 | Blewett et al. |
| 8,397,487 | B2 | 3/2013 | Sennoun et al. |
| 8,991,191 | B2 | 3/2015 | Diaz et al. |
| 9,038,399 | B2 | 5/2015 | MacFarlane |
| 9,091,171 | B2 | 7/2015 | Rodriguez |
| 9,260,974 | B2 | 2/2016 | Hasting et al. |
| 9,976,484 | B2 | 5/2018 | Sawyers-Abbott |
| 10,036,329 | B2 | 7/2018 | Suciu |
| 10,066,551 | B2 | 9/2018 | Verseux |
| 10,337,405 | B2 | 7/2019 | Steen et al. |
| 10,443,622 | B2 | 10/2019 | Rasmussen |
| 10,563,590 | B2 | 2/2020 | Coldwate et al. |
| 11,047,306 | B1 | 6/2021 | Millhaem et al. |
| 2006/0080950 | A1 | 4/2006 | Czachor |
| 2006/0174628 | A1 | 8/2006 | Mikhail |
| 2008/0238202 | A1 | 10/2008 | Kem |
| 2009/0175718 | A1 | 7/2009 | Diaz et al. |
| 2009/0297342 | A1 | 12/2009 | Laborie |
| 2010/0236502 | A1 | 9/2010 | Watanabe et al. |
| 2011/0120075 | A1 | 5/2011 | Diaz et al. |
| 2013/0091850 | A1 | 4/2013 | Francisco |
| 2013/0098047 | A1 | 4/2013 | Suciu |
| 2013/0227960 | A1 | 9/2013 | Bonner |
| 2013/0228647 | A1 | 9/2013 | Bystry, Jr. |
| 2013/0283762 | A1 | 10/2013 | Simpson et al. |
| 2013/0319016 | A1 | 12/2013 | Fontanel et al. |
| 2014/0077116 | A1 | 3/2014 | Walker Santiago et al. |
| 2014/0077507 | A1 | 3/2014 | Barnett |
| 2014/0083106 | A1 | 3/2014 | Mackin et al. |
| 2014/0318759 | A1 | 10/2014 | Ellis et al. |
| 2014/0333127 | A1 | 11/2014 | Edwards |
| 2015/0247462 | A1 | 9/2015 | Suciu |
| 2015/0252683 | A1 | 9/2015 | Hasting et al. |
| 2015/0267616 | A1 | 9/2015 | Verseux |
| 2015/0330310 | A1 | 11/2015 | deGaribody |
| 2016/0123185 | A1 | 5/2016 | Le Pache et al. |
| 2016/0230677 | A1 | 8/2016 | Feulner |
| 2016/0332743 | A1 | 11/2016 | Teicholz |
| 2017/0184025 | A1 | 6/2017 | Sawyers-Abbott |
| 2017/0191419 | A1 | 7/2017 | Bayraktar |
| 2017/0234224 | A1 | 8/2017 | Adibhatia |
| 2017/0342855 | A1 | 11/2017 | Hon |
| 2017/0370291 | A1 | 12/2017 | Rambo |
| 2018/0128178 | A1 | 5/2018 | Snape |
| 2018/0149086 | A1 | 5/2018 | Moniz et al. |
| 2018/0149093 | A1* | 5/2018 | Moniz ..................... F01D 21/12 |
| 2019/0153952 | A1* | 5/2019 | Niergarth ................. F02C 7/14 |
| 2020/0150699 | A1 | 5/2020 | Marotta et al. |

FOREIGN PATENT DOCUMENTS

| | | |
|---|---|---|
| EP | 3650348 A1 | 5/2020 |
| FR | 2955896 A1 | 8/2011 |
| FR | 2955897 A1 | 8/2011 |
| JP | 2004308616 A | 11/2004 |
| JP | 2007262901 A | 10/2007 |

* cited by examiner

GAS TURBINE ENGINE COOLING SYSTEM CONTROL

CROSS-REFERENCE TO RELATED APPLICATIONS

This application is a continuation application of U.S. application Ser. No. 17/160,742, filed Jan. 28, 2021, which is a non-provisional application and is hereby incorporated by reference in its entirety.

FIELD

The present disclosure relates to a gas turbine engine having a cooling system, such as a reverse bleed system, and a method of operating the same.

BACKGROUND

During normal operations, temperatures of gas turbine engine components are maintained within allowable limits by a plurality of cooling processes that transfer heat from the components to one or more heat sinks. When the engine is shutdown, most cooling systems no longer operate. Residual heat in certain engine components (i.e., "soakback") can increase the temperature of other engine components beyond allowable limits, and further may unevenly heat other components sometimes creating a "bow" in the components, also referred to as a "rotor bow."

A particular concern is the formation of carbon (or "coke") deposits in fuel carrying components including fuel nozzles when a hydrocarbon fuel (liquid or gas) is exposed to high temperatures in the presence of oxygen. Some known methods of mitigating coking include rotating the rotor after engine shutdown (i.e. "motoring") or purging the engine with forced air provided from an auxiliary power unit ("APU"), ground power unit ("GPU"), or air conditioning unit after shutdown.

Similarly, a concern with rotor bow is prematurely wearing out seals and clearances, e.g., within the compressor section of the gas turbine engine causing lower efficiency and more frequent repairs. Some known methods of fixing a bowed rotor include relatively slow motoring of the engine for an extended period of time prior to restarting the engine to redistribute the heat and/or cool the components.

One problem with these methods is that they require resources such as electrical power, fuel, external equipment, and/or logistical support that may be unavailable or impractical, and further may increase a startup time for the gas turbine engine.

BRIEF DESCRIPTION

Aspects and advantages of the invention will be set forth in part in the following description, or may be obvious from the description, or may be learned through practice of the invention.

In one exemplary aspect of the present disclosure, a method is provided for operating a gas turbine engine. The method includes: determining data indicative of an operation of a cooling system of the gas turbine engine during a shutdown of the gas turbine engine, following the shutdown of the gas turbine engine, or both; and modifying a startup schedule of the gas turbine engine in response to the determined data indicative of the operation of the cooling system of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
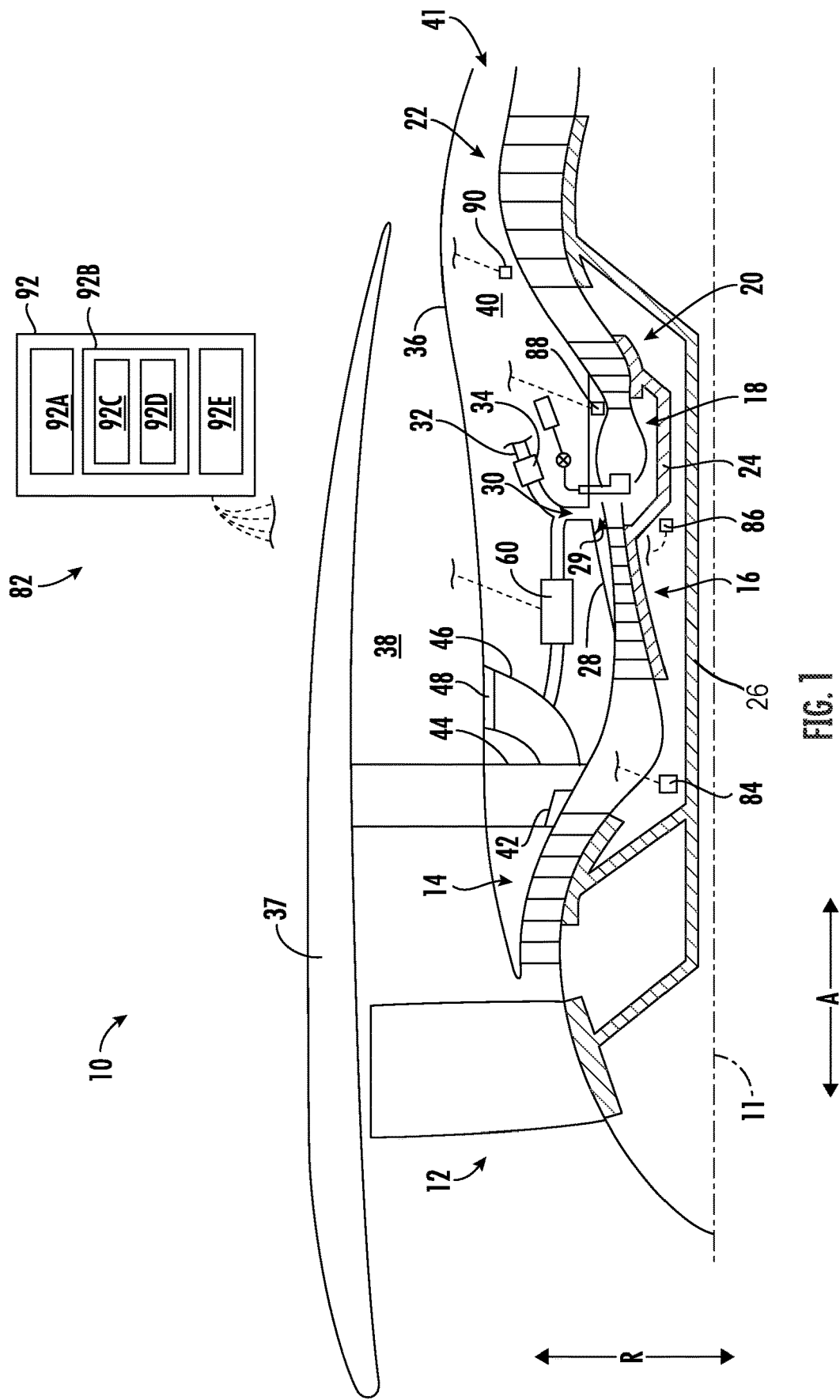
FIG. 1 is a cross-sectional, schematic view of a gas turbine engine in accordance with an exemplary aspect of the present disclosure including a reverse bleed system in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In one exemplary aspect of the present disclosure, a method for operating a gas turbine engine is provided, whereby certain data regarding operation of an air cooling system for a gas turbine engine are determined when the air cooling system is operated following a shutdown of the gas turbine engine. The air cooling system may be a reverse bleed system, and may be configured to reduce or minimize a coke formation within, e.g., fuel nozzles of a combustor of the engine, and may further be configured to reduce or minimize a rotor bow condition within the engine. The data determined may be based on sensed data stored in nonvolatile memory of the engine controller prior to the engine controller shutting down. The data determined may indicate whether or not the air cooling system was operating properly, was prematurely shutdown, etc.

In certain aspects of the present disclosure, the method of the present disclosure may modify a startup sequence for a subsequent startup operation of the gas turbine engine based on the data determined regarding the operation of the air cooling system. For example, if the data indicated that the air cooling system was operating properly, then the modification may be to shorten a motoring of the engine prior to accelerating the engine to a light-off rotational speed, as such may indicate that the engine was properly cooled and is not experiencing rotor bow. By contrast, if the data indicated that the air cooling system was not operating properly, then the modification may be to lengthen the motoring of the engine prior to accelerating the engine to the light-off rotational speed, as such may indicate that the engine was not properly cooled and may be experiencing rotor bow.

Referring now to the drawings, wherein identical numerals indicate the same elements throughout the figures, FIG. 1 depicts an exemplary gas turbine engine 10 defining an axial direction A (and centerline axis 11) and a radial direction R. While the illustrated example is a high-bypass turbofan engine, the principles of the present invention are also applicable to other types of engines, such as low-bypass turbofans, turbojets, turboprops, unducted fan engines or open rotor engines, etc., as well as turbine engines having any number of compressor-turbine spools.

The engine 10 includes a fan 12, a low pressure compressor ("LPC") or booster 14, a high-pressure compressor or "HPC" 16, a combustion section or combustor 18, a high pressure turbine or "HPT" 20, and a low-pressure turbine or "LPT" 22, arranged in serial flow relationship. Collectively, the fan 12, LPC 14, and LPT 22 define a low-pressure system or low-pressure spool of the engine 10. Collectively, the HPC 16 and HPT 20 define a high-pressure spool of the engine 10. The high-pressure spool and combustor 18 may be referred to as a "core" or "core engine".

In operation, pressurized air exiting the HPC 16 is mixed with fuel in the combustor 18 and ignited, thereby generating combustion gases. Some work is extracted from these gases by the HPT 20 which drives the HPC 16 via a high pressure shaft 24. The combustion gases then flow into the LPT 22, which drives the fan 12 and LPC 14 via a low pressure shaft 26. As used herein, the engine 10 is considered to be "operating" when fuel is being is supplied to and burned in the combustor, and the resulting combustion gases are driving rotation of at least the core. As used herein, the engine 10 is considered to be "shut down" when fuel is not being supplied to the combustor. It will be understood that "operating" encompasses numerous operating conditions having varying rotor speeds and varying thrust and/or power outputs. It will be understood that one or more the rotors of the engine 10 may be rotating when fuel is not being provided. This may occur, for example because of wind passing through the engine 10 on the ground, relative wind passing through the engine during aircraft flight (i.e., "wind milling"), or rotation by torque applied from a starter or similar apparatus. Rotation of the engine 10 using a starter (pneumatic, hydraulic, electric, or other) or using an electric machine prior to igniting the engine 10, or prior to accelerating the engine to a lightoff speed (to ignite the engine 10) may be referred to as "motoring" the engine 10.

The HPC 16 includes a number of stages of rotating blades and stationary vanes, all surrounded by a compressor casing 28. The compressor casing 28 incorporates a compressor bleed plenum 29 in fluid communication with the compressor flowpath and in fluid communication with the exterior of the compressor casing 28 through at least one compressor bleed port 30. The compressor bleed plenum 29 may extend over all or a portion of the circumference of the compressor casing 28. It will be understood that different engines may include one or more bleed ports and a particular engine may or may not include a bleed plenum of the type illustrated. As used herein, the term "compressor bleed port" is used generically to refer to a port, opening, plenum, or passage in compressor casing 28 or other analogous structure, such as a combustor casing (e.g., located downstream of the compressor, that is directly or indirectly in fluid communication with the compressor flowpath). The term "compressor bleed port" may refer to an existing structure within the engine 10, or a structure that is newly added to accommodate the reverse bleed system described herein.

One or more bleed ducts 32 are coupled to the compressor bleed port 30 and are configured to conduct extracted airflow away from the HPC 16. The extracted air may be vented for the purpose of controlling the compressor operating line, or may be specifically added for the purpose of introducing reverse bleed cooling air, as described herein. Alternatively, it may be used for purposes such as environmental control systems ("ECS"), pneumatically-powered actuators, engine hot section cooling, and/or clearance control systems. The bleed duct 32 may include a bleed control valve 34 operable to move between open and closed positions, thereby controlling flow through the compressor bleed port 30.

The engine core is surrounded by (i.e., is contained within) a core cowl 36 or core nacelle, which defines an inboard boundary of a bypass flowpath 38 over which fan bypass air flows. Shown is a ducted turbofan, which includes the fan 12 surrounded by a fan nacelle 37 which is spaced-away from the core cowl 36 and defines an outboard boundary of the bypass flowpath 38. In this example the bypass flowpath 38 could also be referred to as a "fan duct".

It will be appreciated, however, that in other exemplary embodiments, the engine 10 may not include the fan nacelle 37, and instead may be an "open rotor" turbofan engine (or other type of engine). With such a configuration, the bypass flowpath 38 would be bounded only by an outer surface of the core cowl 36.

The space inboard of the core cowl 36 and outboard of a core air flowpath is generally referred to as "undercowl space" 40. In practice, the undercowl space 40 may be vented to ambient external environment for example through a vent 41 (shown schematically in FIG. 1). Things that are said to be internal to the engine, for purposes of this disclosure, means things that are located within the space surrounded by the fan nacelle 37, or the core cowl 36 (in a case such as an open rotor engine where the fan nacelle 37 is not present).

The engine 10 may optionally incorporate a variable bleed valve ("VBV") system for controlling LPC stall margin. The VBV system includes one or more variable bleed valves 42 mounted within a fan hub frame 44. The variable bleed valves 42 may be open during low power operation of the engine 10, such as at idle, for bleeding a portion of the compressed air. The variable bleed valves 42 are closed at high power operation of the engine 10, such as during cruise or takeoff, since bleeding is no longer required. When the variable bleed valves 42 are open, air is passed from the LPC flowpath through the fan hub frame 44 and into, e.g., the bypass passage 38 or other bypass space external of the nacelle 37. In the illustrated example, the engine 10 includes at least one bypass duct 46 defining an air flowpath from the fan hub frame 44 to a bleed vent 48 communicating with the bypass flowpath 38.

Figure 2:
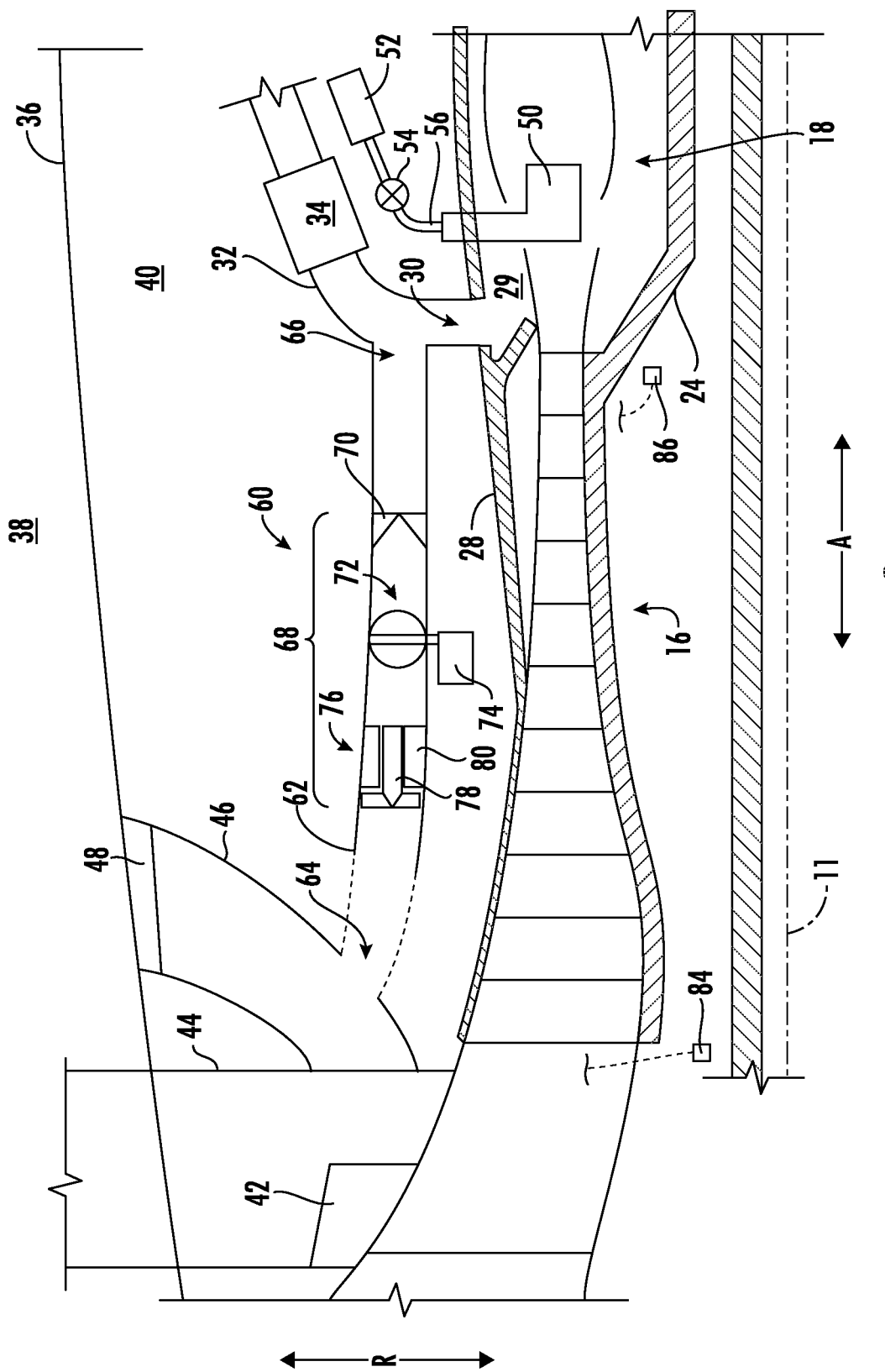
FIG. 2 is a schematic, close-up, sectional view of the exemplary reverse bleed system suitable within the gas turbine engine of FIG. 1.

Referring now also to FIG. 2, providing a close-up view of, e.g., the HPC 16 and combustor 18 of FIG. 1, the combustor 18 includes a plurality of fuel nozzles 50 which are supplied during engine operation with pressurized liquid fuel. The fuel nozzles 50 are connected to a fuel system 52 operable to supply a flow of pressurized liquid fuel at varying flowrates according to operational need. As depicted schematically, the fuel system 52 supplies fuel through a fuel valve 54 coupled to a fuel conduit 56, which is in turn coupled the fuel nozzles 50. In some embodiments, the fuel nozzles 50 and fuel system 52 may implement more than one independent fuel flow circuit (e.g., pilot and main circuits).

It will be understood that each fuel nozzle 50 may generally be a metallic mass including numerous small passages and orifices. The fuel nozzles 50 are subject to the formation of carbon (or "coke") deposits when a hydrocarbon fuel is exposed to high temperatures in the presence of oxygen. This process is referred to as "coking" and is depending on, e.g., an oxygen content of the fuel, coking may generally be a risk when temperatures exceed about 170 degrees C. (350 degrees F.).

During engine operation, both fuel and compressed air flow through the fuel nozzles 50, and the fuel nozzles 50 are bathed in an external flow of relatively cool compressor discharge air. All of these flows carry away heat from the fuel nozzles 50, keeping fuel temperatures relatively low. More specifically, the relatively high volume of fuel through the fuel nozzles 50 primarily maintains a temperature of the fuel nozzles 50 at a relatively low temperature.

When engine operation stops, a volume of fuel may remain in the fuel nozzles 50 and may be heated to coking temperatures. Small amounts of coke interfering with fuel flow through the orifices in the fuel nozzles 50 can make a large difference in fuel nozzle performance.

As will also be appreciated, when engine operation stops, the flow of compressor discharge air also stops. For example, the various turbine section components, which are consistently exposed to combustion gasses at relatively high temperatures, may remain relatively hot following a shutdown of the engine (when the engine operation stops). The heat from these relatively hot components may conduct along the high pressure spool and into the combustor 18. The heat may also move generally upward. When the compressor discharge air is flowing, the airflow may maintain a relatively constant temperature in a circumferential direction of the engine. Once this airflow stops, however, a thermal mismatch between a upper portion of the spool and a lower portion of the spool may form (as the compressor discharge air is no longer providing for the constant circumferential temperature gradient), creating a "bow" in the spool, also referred to as a "rotor bow."

The inventors' analysis and testing has shown that if a flow of air at an appropriate pressure and flow rate is provided to the compressor section, the combustion section, or both (e.g., back through the compressor bleed port 30) following a shutdown of the engine 10, this flow ("a reverse bleed") can preferentially flow downstream from the HPC 16 and provide cooling to the fuel nozzles 50 so as to reduce or prevent fuel nozzle coking. In addition, such a flow may provide cooling to the components susceptible to rotor bow to reduce an amount of rotor bow in the engine 10. For example, at least a portion of this reverse bleed may flow through the compressor section to reduce a rotor bow.

In particular, for the exemplary embodiment depicted, the gas turbine engine further includes an air cooling system in selective airflow communication with the compressor section, the combustion section, or both for providing a flow of cooling air over the fuel nozzles 50 during certain operations, such as during a shutdown of the engine 10 or after a shutdown of the engine 10. For the embodiment shown, the air cooling system is in airflow communication with a bleed air assembly (and in particular the compressor bleed port 30 for the embodiment shown), and as such may be referred to as a reverse bleed system 60.

As will be appreciated, however, in other embodiments, the air cooling system may be any other suitable air cooling system for generating a flow of cooling air into or through the compressor section, the combustion section, or both to reduce coking and/or rotor bow.

More specifically, as is depicted in FIG. 2, the reverse bleed system 60 may be used to supply cooling air flow, or a reverse bleed flow over the fuel nozzles 50 during a shutdown of the engine 10 or after a shutdown of the engine 10.

The reverse bleed system 60 includes a cooling duct 62 disposed in the engine 10. It may be mounted, for example, wholly or partially in the undercowl space 40. In particular, for the embodiment shown, it is mounted completely within the undercowl space 40, "internal to" the undercowl space 40. The cooling duct 62 defines an inlet 64 disposed in fluid communication with a source of cooling air and an outlet 66 disposed in airflow communication with the compressor section (such as the HPC 16), the combustor 18, or both. Particularly for the embodiment shown, the cooling duct 62 is in airflow communication with the HPC 16 and combustor 18 via the compressor bleed port 30. The complete cooling duct 62 may be built up from components such as tubes, connectors, pipe joints, and the like.

In the embodiment of FIG. 2, the inlet 64 is connected in fluid communication with the bypass duct 46. In the embodiment of FIG. 2, the outlet 66 is connected to the existing bleed duct 32, which in turn is connected to the compressor bleed port 30.

However, in other embodiments, the cooling duct 62 may be configured in any other suitable manner to provide a reverse bleed flow over the fuel nozzles 50. For example, the cooling duct 62 may be directly connected to a dedicated opening in the cowl 36, may receive environmental air within the undercowl space 40, etc. For example, as is depicted in phantom, the cooling duct 62 may not extend to the bypass duct 46, and instead the cooling duct 62 may simply be open to the undercowl space 40, thereby allowing air from the undercowl space 40 to be directly drawn into the valve assembly 68 rather than from the bypass duct 46. With such a configuration, the inlet 64 may accordingly be exposed to the undercowl space 40.

Referring still to FIG. 2, the cooling duct 62 incorporates a valve assembly 68 including one or more valves operable to control airflow between the inlet 64 and the outlet 66. Two or more valves may be used to provide redundancy, and/or monitor or control airflow through duct 62. In this example, first and second valves 70, 72 are used in series, where the first valve 70 is closest to the outlet 66. Stated another way, the first and second valves 70, 72 are in "series fluid communication", meaning that a fluid flow passes through one valve before encountering another valve. "Series flow communication" stands in contrast to "parallel flow communication".

In the illustrated example, the first valve 70 is a check valve which may be passively biased towards an open position by, e.g., a spring, stored fluid pressure, weight, or other suitable mechanism and arranged to permit airflow in a direction from the inlet 64 towards the outlet 66, but to block airflow in the opposite direction. It will be understood that valves may exhibit some fluid leakage even in the closed position. Accordingly, the operation of a valve in the closed position to block airflow, except for inherent leakage, may be described as "substantially preventing flow."

In the illustrated example, the second valve 72 is a controllable valve having a flow control element (e.g., a gate, flapper, ball, etc.) movable between open and closed positions. In the open position, the second valve 72 permits airflow between the inlet 64 and the outlet 66. In the closed position, the second valve 72 blocks airflow between the inlet 64 and the outlet 66.

Numerous types of controllable valves may be used. In one example, the controllable valve may incorporate or be coupled to an actuator 74 which provides motive force for the valve's flow control element. Examples of suitable types of actuators include pneumatic, hydraulic, or electrical devices.

In one example, the controllable valve may be of a type in which a spring or similar element urges the controllable valve towards an open position, and fluid pressure acts in opposition to the spring to move the valve towards the closed position. Suitable fluids could include, for example compressed air, pressurized oil, or pressurized fuel. In one example, the controllable valve may be coupled to the fuel system 52 described above (see FIG. 1) in such a manner that pressurized fuel may be provided to the valve during engine operation. The fuel pressure thus tends to keep the valve closed when the engine 10 is operating. This type of valve may be referred to as a fluid-pressure-responsive passive valve, for example a "passive fuel valve".

In this specific example where one of the first and second valves 70, 72 is a check valve and the other of the first and second valves 70, 72 is a controllable valve, either valve may be placed in the upstream or downstream position relative to the other valve. However, check valves tend to close more reliably when subjected to a greater pressure differential. The first valve 70 would inherently be exposed to a higher air pressure, being closer to the compressor bleed port 30. Accordingly, the first valve 70 may be a check valve.

The cooling duct 62 includes a cooling blower 76 between the valve assembly 68 and the inlet 64. The cooling blower 76 may be any apparatus operable to blow, pump, or move a cooling airflow from the inlet 64 towards the outlet 66. In the illustrated example, the cooling blower 76 includes a rotor 78 carrying a plurality of fan blades. The blower 76 may, in the alternative, be located at, within or proximate to the inlet 64 and distal of the valves 72, 70.

A power source for operating the cooling blower 76 may be mechanical, hydraulic, pneumatic, or electrical. In the illustrated example, the blower's rotor 78 is coupled to an electric motor 80. In one example, the motor 80 may be an AC induction motor or DC motor.

The cooling blower 76 may be sized to provide an adequate discharge pressure and flow rate for the cooling process described in more detail below. As one example, the cooling blower 76 may be sized to produce air flow on the order of approximately 0.05 kg/s (0.1 lb/s) to approximately 0.23 kg/s (0.5 lb/s) at approximately 0.69 kPa (0.1 psi) to approximately 6.9 kPa (1 psi). In one exemplary end use, the cooling blower 76 may be sized to produce air flow on the order of approximately 0.12 kg/s (0.25 lb/s) at approximately 3.4 kPa (0.5 psi).

Operation of the reverse bleed system 60 is generally as follows. When the engine 10 is running, the reverse bleed system 60 is inactive. Portions of the cooling air duct 62 will be pressurized with high-temperature air coming from the compressor bleed port 30. The valve assembly 68 will block the majority of the flow from the outlet 66 towards the inlet 64. As noted above, some valve leakage is expected to occur. Any leakage will pass through the cooling blower 76, inlet 64, and in the example of FIG. 2, through the bypass duct 46 and vent 48.

After engine shutdown, soakback may occur which may heat the fuel nozzles 50 to an unacceptable temperature, and further certain components of the engine 10 may experience rotor bow. The reverse bleed system 60 may be used to move cooling air flow from the inlet 64 through the cooling duct 62, through the outlet 66 and into the compressor bleed port 30. Subsequently, the cooling air can pass over the fuel nozzles 50 and other parts of the core to lower their respective temperatures and to reduce or prevent coking and to reduce or prevent rotor bow. Fundamentally, the reverse bleed system 60 is employed by (1) operating the cooling blower 76 and (2) opening the valve or valves of the valve assembly 68, at a time during or after a shutdown of the engine 10. For example, the reverse bleed system 60 may be operated following a shutdown of the engine 10 and prior to a subsequent startup of the engine 10.

As a possible alternative, the reverse bleed system 60 could be used to move cooling air flow from downstream portions of the engine 10, through the compressor bleed port 30, through the outlet 66, through the cooling duct 62, and out through the inlet 64. In this sense the so-called "reverse bleed" system 60 would be used to cause air movement through the bleed port in the same direction as airflow through the bleed port during flight. This could be accomplished by assuring that all valves are open or otherwise configured to permit flow in this direction and operating the cooling blower 76 to move air in the opposite direction as described above. Stated another way, the cooling blower 76 could be used to "suck" air from the engine 10 rather than "blow" it into the engine 10.

It will be appreciated, however, that in other exemplary embodiments, the engine 10 may include any other suitable air cooling system for providing a cooling airflow over the fuel nozzles 50, or otherwise capable of cooling the fuel nozzles 50 and other components susceptible to rotor bow. For example, the air cooling system may be configured to provide cooling air from any suitable location (e.g., ambient, under-cowl 40, compressor section, dedicated cooling airflow source, etc.). Additionally, or alternatively, the air cooling system may be configured to utilize the cooling airflow to reduce a temperature of the fuel nozzles 50 or other component susceptible to coking from soak back (e.g., certain fuel lines), component causing bowed rotor, etc. in any other suitable manner. For example, the air cooling system may be configured to provide the cooling airflow over the components directly, may be configured to cool components through an intermediate component (e.g., cooling components thermally coupled to the components to be cooled), etc. Additionally, or alternatively, still, the air cooling system may be positioned at any other suitable location for performing the functions described herein.

In addition, numerous arrangements are possible for control and operation of the air cooling system/the reverse bleed system 60. In particular, back also to FIG. 1, the exemplary gas turbine engine 10 further includes an engine controller 82, such as a Full Authority Digital Engine Control controller ("FADEC") or Electronic Engine Controller ("EEC"). The engine controller 82 is configured to receive the data sensed from one or more sensors and, e.g., make control decisions based on the received data. In the embodiment depicted, the engine 10 includes sensors for sensing data indicative of engine speeds, engine temperatures, etc. In particular, the exemplary engine 10 shown includes a first sensor 84 for sensing data indicative of a rotational speed of the low speed spool, a second sensor 86 for sensing data indicative of a rotational speed of the high speed spool, and a third sensor 88 for sensing data indicative of an engine temperature (and in particular of a turbine inlet temperature), and a fourth sensor 90 for sensing data indicative of another engine temperature (and in particular of an exhaust gas temperature). It will be appreciated that each of these sensors may be a single sensor, or an array of sensors, may be any suitable type of sensor for sensing the data indicative of the parameter, and further may be located at any suitable location for sensing the data indicative of the parameter.

Referring particularly to the operation of the controller 82, in at least certain embodiments, the controller 82 can include one or more computing device(s) 92. The computing device(s) 92 can include one or more processor(s) 92A and one or more memory device(s) 92B. The one or more processor(s) 92A can include any suitable processing device, such as a microprocessor, microcontroller, integrated circuit, logic device, and/or other suitable processing device. The one or more memory device(s) 92B can include one or more computer-readable media, including, but not limited to, non-transitory computer-readable media, RAM, ROM, hard drives, flash drives, and/or other memory devices.

The one or more memory device(s) 92B can store information accessible by the one or more processor(s) 92A, including computer-readable instructions 92C that can be executed by the one or more processor(s) 92A. The instructions 92C can be any set of instructions that when executed by the one or more processor(s) 92A, cause the one or more processor(s) 92A to perform operations. In some embodiments, the instructions 92C can be executed by the one or more processor(s) 92A to cause the one or more processor(s) 92A to perform operations, such as any of the operations and functions for which the controller 82 and/or the computing device(s) 92 are configured, the operations for operating a gas turbine engine 10 and/or cooling system/reverse bleed system 60 (e.g., method 300), as described herein, and/or any other operations or functions of the one or more computing device(s) 92. The instructions 92C can be software written in any suitable programming language or can be implemented in hardware. Additionally, and/or alternatively, the instructions 92C can be executed in logically and/or virtually separate threads on processor(s) 92A. The memory device(s) 92B can further store data 92D that can be accessed by the processor(s) 92A. For example, the data 92D can include data indicative of power flows, data indicative of engine/aircraft operating conditions, and/or any other data and/or information described herein.

The computing device(s) 92 can also include a network interface 92E used to communicate, for example, with the other components of the gas turbine engine 10, the aircraft incorporating the gas turbine engine, etc. For example, in the embodiment depicted, as noted above, the gas turbine engine 10 includes one or more sensors 84, 86, 88, 90 for sensing data indicative of one or more parameters of the gas turbine engine. The controller 82 is operably coupled to the one or more sensors through, e.g., the network interface 92E, such that the controller 82 may receive data indicative of various operating parameters sensed by the one or more sensors during operation. Further, for the embodiment shown the controller 82 is operably coupled to, e.g., the air cooling system/reverse bleed system 60. In such a manner, the controller 82 may be configured to operate the reverse bleed system 60 in response to, e.g., the data sensed by the one or more sensors.

The network interface 92E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
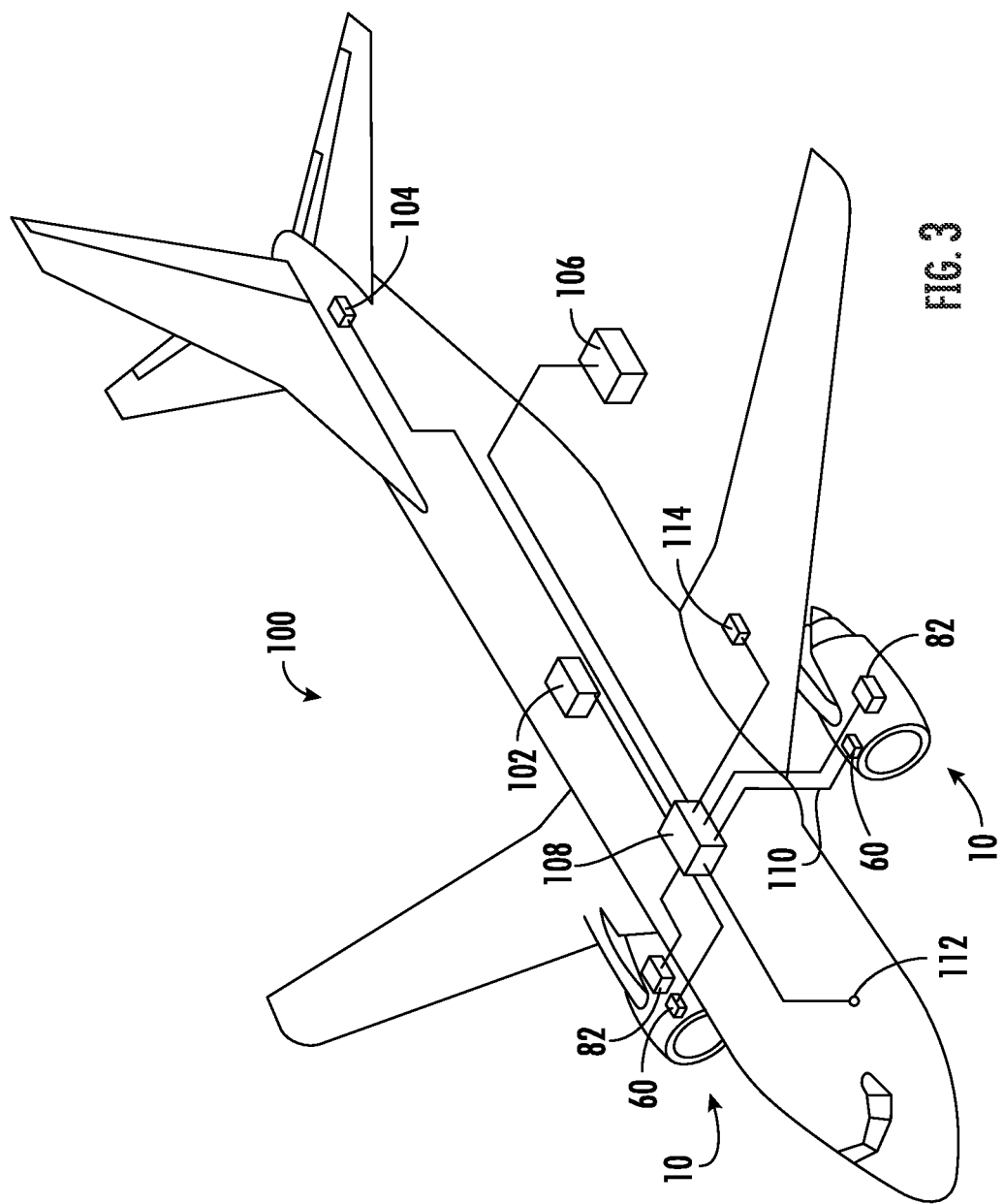
FIG. 3 is a schematic perspective view of the gas turbine engine of FIG. 1 mounted to an aircraft.

Referring now briefly to FIG. 3, providing a perspective, schematic view of an aircraft 100 as may incorporate the exemplary engine 10 and reverse bleed system 60 described above, the engine 10 incorporating reverse bleed system 60 may be installed in the aircraft 100 having at least one electrical power source such as a battery and inverter 102, an auxiliary power unit 104, a connection to a ground power unit 106 or other ground-based power source, or another engine 10 having an electrical generator.

In one example, the aircraft 100 includes an electronic aircraft controller 108 in data communication with the engine controller 82 described above (see FIG. 1) and also including a controllable electrical power connection 110 to the air cooling system/reverse bleed system 60 (including, e.g., the cooling blower 76). The aircraft controller 108 may have connections to various inputs such as cockpit switch positions, an/or sensors such as an outside air temperature (OAT) probe 112 or a weight-on-wheels sensor 114. The aircraft controller 108 may be configured in a similar manner as the exemplary engine controller 82 described above with reference to FIG. 1.

Various control methods in accordance with exemplary aspects of the present disclosure are described below with reference to FIG. 4.

Figure 4:
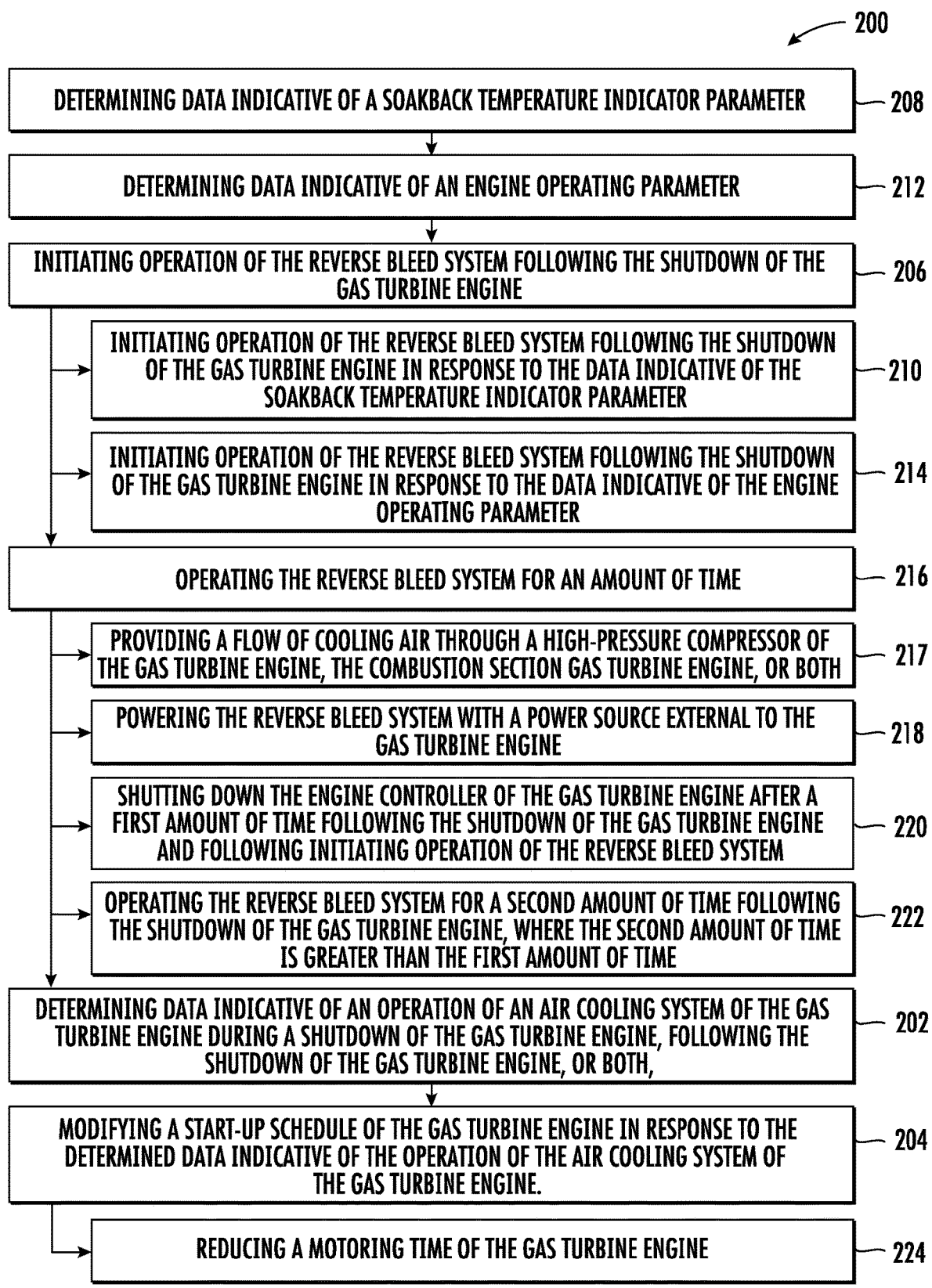
FIG. 4 is flow diagram of a method for operating a gas turbine engine in accordance with the present disclosure.

In particular, referring now to FIG. 4, a method 200 for operating a gas turbine engine is provided. In certain exemplary aspects, the method 200 may be utilized with one or more of the exemplary aircraft, engines, air cooling systems (e.g., reverse bleed systems), etc. described above with reference to FIGS. 1 through 3. However, in other exemplary aspects, the exemplary method 200 may be utilized with any other suitable aircraft, engine, air cooling systems, etc.

For the exemplary aspect of the method 200 depicted in FIG. 4, the method 200 generally includes at (202) determining data indicative of an operation of an air cooling system of the gas turbine engine during a shutdown of the gas turbine engine, following the shutdown of the gas turbine engine, or both, and at (204) modifying a start-up schedule of the gas turbine engine in response to the determined data indicative of the operation of the air cooling system of the gas turbine engine.

The term "startup schedule" generally refers to the startup operating procedure for a gas turbine engine, including in certain exemplary aspects, an amount of time to rotate the engine with a starter or other electric machine prior to increasing the rotational speed of the engine to a lightoff rotational speed.

In particular, for the exemplary aspect of the method 200 depicted in FIG. 4, the air cooling system may be any suitable air cooling system for providing a flow of cooling air to a component of the gas turbine engine configured to contain fuel during or after a shutdown of the engine, one or more components susceptible to rotor bow, or both. More specifically, for the exemplary aspect of the method 200 depicted in FIG. 4, the air cooling system is a reverse bleed system configured to provide a flow of cooling air over a component of a combustor of the gas turbine engine during operation of the reverse bleed system. For example, the reverse bleed system may be configured to provide a flow of cooling air over one or more fuel nozzles of the combustor of the gas turbine engine during operation of the reverse bleed system.

More specifically, it will be appreciated that prior to determining the data indicative of the operation of the air cooling system/reverse bleed system at (202) and modifying the start-up schedule at (204), for the exemplary aspect of the method 200 depicted in FIG. 4, the method 200 additionally includes at (206) initiating operation of the reverse bleed system following the shutdown of the gas turbine engine. Initiating the operation of the reverse bleed system at (206) may be at least in part in response to one or more environmental/ambient condition parameters and engine parameters, and further may be a command from an engine controller.

For example, for the exemplary aspect depicted, the method 200 further includes at (208) determining data indicative of a soakback temperature indicator parameter. The soakback temperature indicator parameter may be any suitable parameter for indicating that an anticipated temperature of one or more components configured to contain fuel following a shutdown of the engine will exceed a predetermined threshold. The predetermined threshold may be a temperature threshold at which any fuel in the component is likely to coke. For example, the soakback temperature indicator parameter may be an ambient condition parameter, such as an ambient temperature parameter, an ambient altitude parameter, etc. Additionally, or alternatively, the soakback temperature indicator parameter may be an engine temperature parameter, such as an exhaust gas temperature, compressor exit temperature, turbine inlet temperature, etc. The soakback temperature indicator parameter may additionally or alternatively be based on software heat transfer models utilizing one or more of the above parameters and/or other data, etc.

For the exemplary aspect depicted, initiating operation of the reverse bleed system at (206) further includes at (210) initiating operation of the reverse bleed system following the shutdown of the gas turbine engine in response to the data indicative of the soakback temperature indicator parameter determined at (208). For example, the data determined at (208) may include data indicative of the soakback temperature indicator parameter exceeding a predetermined threshold, and the method 200 may initiate operation of the reverse bleed system in response to such data.

Also by way of example, for the exemplary aspect depicted the method 200 further includes at (212) determining data indicative of an engine operating parameter. The engine operating parameter may be any suitable parameter indicating that the engine and/or aircraft incorporating the engine is in a desired operating condition for initiating the reverse bleed system. For example, the data indicative of the engine operating parameter may be data indicative of the engine being powered on or off (e.g., from a user/operator switch within a cockpit of the aircraft, or an electronic signal), a rotational speed of one or more components of the engine, a weight on wheels sensor reading (e.g., from a weight on wheels sensor 114, to ensure the shutdown is not a mid-flight shutdown), etc. Additionally or alternatively, the data indicative of the engine operating parameter may include data indicative of various other conditions of systems of the engine, such as an open/closed indicator on a reverse bleed valve of the engine.

In one exemplary aspect of the method 200, as will be described in more detail below with reference to, e.g., FIG. 5, in certain exemplary aspects, the data indicative of the engine operating parameter may include data indicative of a rotational speed of a shaft of the engine, such as a high-pressure shaft of the engine. The data indicative of the engine operating parameter may include data indicative of a rate of decay of the rotational speed of the shaft of the engine and/or data indicative of the rotational speed falling below a predetermined threshold (e.g., 10% of the engine's rated speed, such as 5% of the engine's rated speed).

With such an exemplary aspect, it will be appreciated that initiating operation of the reverse bleed system at (206) further includes at (214) initiating operation of the reverse bleed system following the shutdown of the gas turbine engine in response to the data indicative of the engine operating parameter determined at (212). For example, in certain exemplary aspects, e.g., where the data indicative of the engine operating parameter may include data indicative of a rate of decay of the rotational speed of the shaft of the engine and data indicative of the rotational speed falling below a predetermined threshold, initiating operation of reverse bleed system at (214) may include initiating operation of the reverse bleed system after a determined amount of time following the engine falling below the predetermined threshold. The determined amount of time may be a preset time (e.g., a predetermined amount of time), or alternatively may be based on the rate of decay of the rotational speed of the shaft.

Following initiating operation of the reverse bleed system at (206), the method 200 further includes at (216) operating the reverse bleed system for an amount of time. Operating the reverse bleed system at (216) may include operating the reverse bleed system for a determined amount of time (e.g., based on one or more sensed parameters, based on the soakback temperature indicator parameter (e.g., high ambient temperature, longer operation; higher engine temperature, longer operation; higher altitude, longer operation), etc.), or alternatively, may include operating the reverse bleed system for a predetermined amount of time (e.g., 30 minutes, 60 minutes, 90 minutes, etc.). Operating the reverse bleed system at (216) includes at (217) providing a flow of cooling air through a high-pressure compressor of the gas turbine engine, the combustion section gas turbine engine, or both.

For example, in certain aspects, providing the flow of cooling air at (217) may include providing the flow of cooling air through the high-pressure compressor, the combustion section, or both and over one or more components of the gas turbine engine configured to contain fuel following the shutdown of the gas turbine engine.

Alternatively, however, providing the flow of cooling air at (217) may include extracting air from the high-pressure compressor, the combustion section, or both to generate a flow of cooling air over one or more components of the gas turbine engine configured to contain fuel following the shutdown of the gas turbine engine. For example, the one or more components may be one or more fuel nozzles of the combustion section of the gas turbine engine.

Notably, in certain exemplary aspects of the method 200, the method 200 may further include terminating operation of the reverse bleed system prior to the determined amount of time or prior to the predetermined amount of time. The operation of the reverse bleed system may be terminated prior to the determined or predetermined amount of time as a result of a restarting of the gas turbine engine, disconnecting the gas turbine engine from a power source (such as a ground power source), a commanded termination for maintenance operations, etc. With such exemplary aspect, the method 200 may save data indicative of the amount of time the reverse bleed system operated, which may be indicative of the operation of the reverse bleed system (and used, e.g., at step (202)).

It will be appreciated that in at least certain exemplary aspects, an engine controller for the engine including the reverse bleed system may be configured to power down after an amount of time following the shutdown of the engine. In certain exemplary aspects, this amount of time may be less than the amount of time it is desirable to operate the reverse bleed system. In such a manner, it will be appreciated that for the exemplary aspect of the method 200 depicted, operating the reverse bleed system for the amount of time at (216) further includes at (218) powering the reverse bleed system with a power source external to the gas turbine engine. For example, in certain exemplary aspects, the power source external to the gas turbine engine may be an electric energy storage unit of the aircraft (e.g., a battery pack), a ground power system, an auxiliary power unit of the aircraft, an electric machine coupled to or driven by another engine of the aircraft, etc.

More specifically, for the exemplary aspect of the method 200 depicted in FIG. 4, it will be appreciated that the method 200 further includes at (220) shutting down the engine controller of the gas turbine engine after a first amount of time following the shutdown of the gas turbine engine and following initiating operation of the reverse bleed system at (206). With such an exemplary aspect, operating the reverse bleed system for the amount of time at (216) further includes at (222) operating the reverse bleed system for a second amount of time following the shutdown of the gas turbine engine, where the second amount of time is greater than the first amount of time. For example, the second amount of time may be at least 50% greater, such as 100% greater, such as five times greater, such as up to 100 times greater than the first amount of time.

As briefly noted above, the method 200 further includes at (202) determining data indicative of the operation of the gas turbine engine during the shutdown of the gas turbine engine, following the shutdown of the gas turbine engine, or both. In certain exemplary aspects, the data indicative of the operation of the reverse bleed system determined at (202) may include data indicative of the reverse bleed system operating properly.

For example, in certain exemplary aspects, the data indicative of the operation of the reverse bleed system determined at (202) may include data indicative of an engine temperature at a first time following the initiation of the reverse bleed system at (206) and data indicative of the engine temperature at a second time following initiation of the reverse bleed system at (206). The second time may be after the first time. Further, the first time may be a relatively short time period after initiating ration of the reverse bleed system at (206) and the second time may be relatively short time period prior to shutting down the engine controller at (220). The "short time period" may refer to amount time less than or equal to about three minutes, such as less than or equal to about one minute, such as less than or equal to about 30 seconds, such as less than or equal to about 10 seconds.

With such an exemplary aspect, the data indicative of the operation of the reverse bleed system determined at (202) may further include data indicative of a difference between the engine temperature at the first time and at the second time. For example, in determining the data indicative of the operation of the reverse bleed system at (202), the method may determine a slope between the engine temperature at the first time and at the second time to determine if the engine temperature is increasing or decreasing. If the engine temperature is increasing, such may indicate that the reverse bleed system is not operating properly, whereas if the engine temperature is decreasing, such may indicate that the reverse bleed system is operating properly. The engine temperature may be, e.g., an exhaust gas temperature, a turbine inlet temperature, a compressor exit temperature, etc.

As also noted above, the method 200 further includes at (204) modifying the startup schedule of the gas turbine engine in response to the data indicative of the operation of the reverse bleed system of the gas turbine engine determined at (202). For the exemplary aspect depicted, modifying the startup schedule of the gas turbine engine at (204) further includes at (224) reducing a motoring time of the gas turbine engine.

As will be appreciated, when an engine experiences a rotor bow, it may be necessary to "motor" the engine for an amount time prior to initiating the remaining starting sequence for the gas turbine engine. In such manner, it will be appreciated that motoring generally refers to rotating one more components of the engine with, e.g., a starter or other electric motor to allow the bowed components to distribute the heat to reduce the bowing of the component. The motoring process can be time consuming depending on the degree of the rotor bow. However, if it is determined that the reverse bleed system has been operating properly, such may indicate that the components are not "bowed" or are not bowed to the same extent that they otherwise would be, which may allow for a reduction in the motoring time of the engine prior to initiating the remaining portion of the starting sequence for the gas turbine engine.

It will be appreciated that in other exemplary aspects, the method 200 may additionally or alternatively determine data indicative of the reverse bleed system not operating properly, or not operating at 100% effectiveness at (202). With such an exemplary aspect, modifying the startup schedule of the gas turbine engine at (204) may additionally or alternatively include increasing a motoring time of the gas turbine engine within the startup sequence.

It will be appreciated, however, that the exemplary aspect of the method 200 described above with reference to FIG. 4 is by way of example only. In other exemplary aspects, any other suitable air cooling system may be utilized in place of the reverse bleed system discussed, and further that in other exemplary aspects, the air cooling system may be configured to provide a flow of cooling air to additional or alternative components of the gas turbine engine. For example, in other exemplary aspects, the air cooling system may be, e.g., a system for providing a forced airflow through a main airflow path of the engine through an inlet to the engine (e.g., a standalone fan position at a forward end of the gas turbine engine, the aft end of the gas turbine engine, or both). Also by way of example, in other exemplary aspects, the component cooled by the air cooling system may be any other suitable component configured to contain fuel following a shutdown of the gas turbine engine, e.g., one or more fuel lines, auxiliary burners or combustors, etc.

Figure 5:
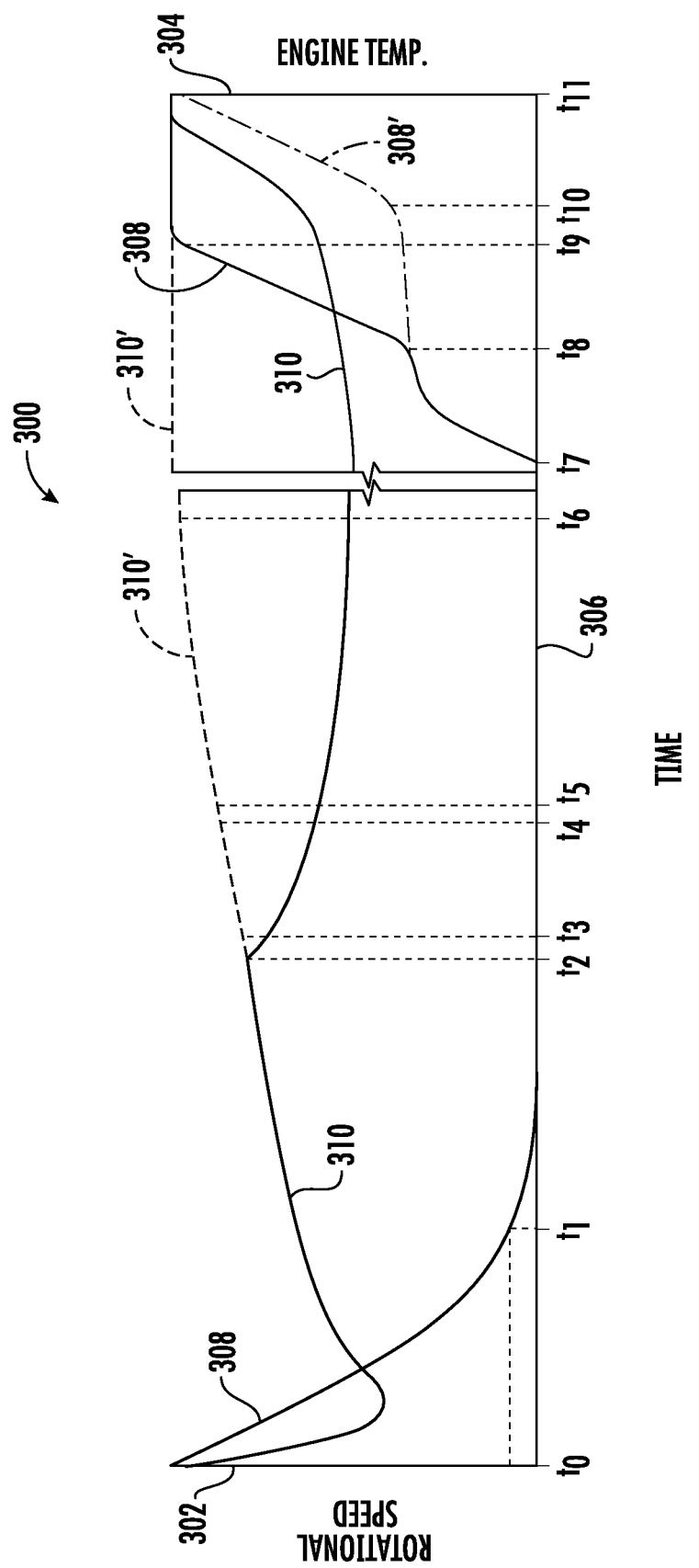
FIG. 5 is a graph depicting certain parameters of an engine operated in accordance with the method of FIG. 4.

Referring now to FIG. 5, a graph 300 is provided depicting a rotational speed of a gas turbine engine and an engine temperature of the gas turbine engine over a time period from a shutdown of the gas turbine engine to a subsequent startup of the gas turbine engine. One exemplary operation of the method 300 is described below with reference to the graph 300 of FIG. 5.

As will be appreciated, the graph 300 generally includes a Y-axis representing rotational speed (on the left side of the graph 300, Y-axis 302) and engine temperature (on the right side of the graph 300, Y-axis 304), and an X-axis 306 depicting time. A first line 308 is depicted representing the rotational speed of the engine over the time period and a second line 310 is depicted representing the engine temperature over the same time period. The rotational speed may be a shaft speed of the gas turbine engine, such as a high-pressure shaft speed or low-pressure shaft speed. The engine temperature may be an exhaust gas temperature, a turbine inlet temperature, a compressor exit temperature, etc.

At T0, the gas turbine engine is shutdown. Shutting down the engine may include, e.g., operating a switch or other control mechanism within a cockpit of the engine by an operator of the gas turbine engine/aircraft including the gas turbine engine. Further, shutting down the engine may include shutting down a fuel flow to a combustor of the gas turbine engine. Following the shutdown of the gas turbine engine, the rotational speed of the gas turbine engine drops. The engine temperature similar drops initially, but may begin to climb due to the amount of heat stored within the various components of the gas turbine engine, given a relatively high thermal mass of these components, and given that the engine speed is slowing down and airflow through the gas turbine engine is correspondingly decreasing.

At or around shutdown/T0, an aircraft controller, an engine controller, or both may provide a command to an air cooling system, which specifically for the embodiment shown may be a reverse bleed system, to activate the air cooling system/reverse bleed system. In particular, for the aspects shown, the command to activate the reverse bleed system may initially be a failsafe launch command from the engine controller or the aircraft controller to initiate operation of the reverse bleed system after a predetermined amount of time if the reverse bleed system is not already operating.

More specifically, for the graph 300 shown in FIG. 5, the engine controller may further determine when the rotational speed of the gas turbine engine has reached a predetermined level, shown at T1, which may be, e.g., 10% or less of a rated speed for the gas turbine engine, such as 5% or less of the rated speed of the gas turbine engine. This predetermined level is equal to or higher than a level at which the sensors or other mechanisms that determine the rotational speed typically cut out.

After determining the engine has reached the predetermined level, the engine controller may wait an amount of time prior to initiating operation of the reverse bleed system at T2. In particular, the engine controller may send a command to the aircraft controller to provide power to the cooling system for, e.g., a determined amount of time or a predetermined amount of time. In response, the aircraft controller may be programmed to provide electrical power to the reverse bleed system for the specified amount of time and then to shut off electrical power.

The amount of time between T1 and T2 may be based on a rate of decay of the rotational speed of the gas turbine engine, and/or one or more known configurations of the gas turbine engine. For example, if the gas turbine engine includes, e.g., hydraulic pumps or other accessory systems coupled to the high-pressure spool, these components may increase an amount of drag on the high-pressure spool (resulting in a quicker decrease in the rotational speed). In such a case, the amount of time between T1 and T2 may be reduced. The amount of time between T1 and T2 may be, e.g., less than or equal to five minutes, such as less than or equal to three minutes, such as less than or equal to two minutes, such as less than one minute, such as less than or equal to 30 seconds, such as greater than or equal to five seconds.

During typical operations, the reverse bleed system may operate for an amount of time after initiating operation at T2. In particular, for the embodiment shown, the reverse bleed system is configured to operate from T2 to T6. Notably, the engine controller is typically configured to shut down an amount of time after shutdown of the gas turbine engine at T0 that is less than the amount of time from T0 to T6. In the graph 300 depicted in FIG. 5, the engine controller is configured to shut down at T5. As mentioned above, it will therefore be appreciated that operating the reverse bleed system may include providing power from a power source external to the gas turbine engine.

In order to determine if the reverse bleed system is operating properly/has operated properly, the engine controller is configured to determine the engine temperature at a first time shortly after initiating operation of the reverse bleed system, and is further configured to determine the engine temperature at a second time shortly prior to shutting down the engine controller. The first time shortly after initiating operation of the reverse bleed system shown at T3 and the second time shortly prior to the shutting down of the engine controller is shown at T4. The terms "shortly after" and "shortly prior" are simply terms used for convenience and do not require any inherent limitations. In certain exemplary aspects, these time periods may be, e.g., between two seconds and 30 seconds.

As will be appreciated from the engine temperature line 310 in the graph 300 of FIG. 5, if the reverse bleed system is operating properly, a slope between the engine temperature at the first time T3 and the second time T4 is a negative slope, indicating that the engine temperature is decreasing. Depicted in phantom is an alternative engine temperature line 310' starting at T2 illustrating the engine temperature from T2 on if the reverse bleed system does not operate properly. As is shown, if the reverse bleed system is not operating properly, a slope between the engine temperature at the first time T3 and the second time T4 is a positive slope indicating that the engine temperature is increasing.

Accordingly, once it comes time to start the gas turbine engine back up, depicted at T7, if the reverse bleed system operated properly, the engine temperature will be relatively low. By contrast, if the reverse bleed system did not operate properly, the engine temperature will be relatively high. If the engine temperature is relatively high, such may indicate that coking has occurred within, e.g., the fuel nozzles, and further may indicate that the engine is experiencing a relatively high degree of rotor bow. If the engine is experiencing a relatively high degree of rotor bow, it will be necessary to motor the gas turbine engine for a relatively long amount of time to allow the heat to redistribute and the relatively high degree of rotor bow to mitigate. By contrast, if the engine temperature is relatively low, and the engine is experiencing a relatively low amount of rotor bow, then it may not be necessary to motor the engine for very long prior to accelerating the engine for startup.

For example, if the reverse bleed system operated properly following the prior shut down, such as in the embodiment depicted in the graph 300 of FIG. 5, then a time period for motoring the gas turbine engine, shown between T7 and T8 may be relatively low, prior to accelerating the engine for startup at T8. Such may result in a relatively low amount of time between initiating the startup sequence at T7 and achieving a light-off rotational speed at T9. By contrast, if the reverse bleed system did not operate properly following the prior shut down, such as depicted in phantom in the graph 300 of FIG. 5, then a time period for motoring the gas turbine engine, shown between T7 and T10 (via phantom engine speed line 308'), prior to accelerating the engine for startup at T10 is relatively high. Such may result in a relatively high amount of time between initiating the startup sequence at T7 and achieving a light-off rotational speed at T11.

In such manner, the engine controller, the aircraft controller, or both may determine data indicative of an operation of the rotor bow system following the prior shut down of the gas turbine engine, and in response may modify the startup sequence for the subsequent startup of the gas turbine engine. For example, in the event the data indicative of the operation of the rotor bow system indicates that the rotor bow system operated properly, modifying the startup sequence for the subsequent startup of the gas turbine engine may include reducing a motoring time of the gas turbine engine, saving time and energy for the subsequent startup sequence.

Figure 6:
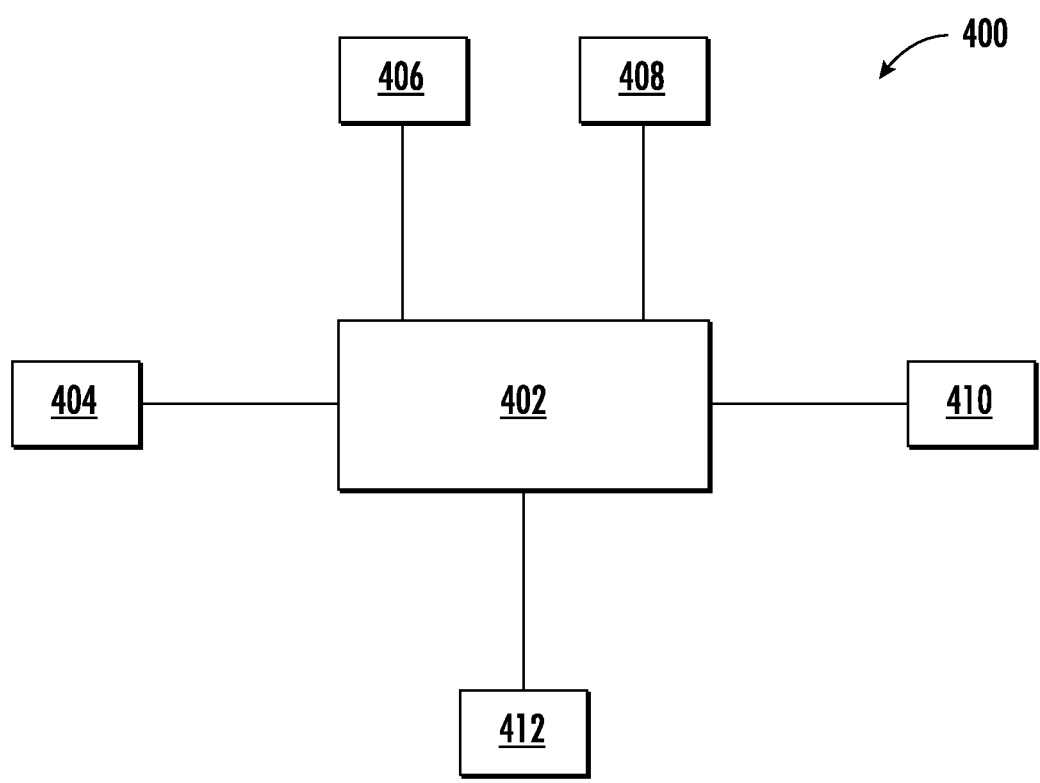
FIG. 6 is a control scheme in accordance with the present disclosure.

Moreover, it will be appreciated that in addition to the exemplary steps outlined above, an engine controller for an engine incorporating an air cooling system/reverse bleed system in accordance with one or more exemplary aspects of the present disclosure may further be configured to perform additional functions. For example, referring now to FIG. 6, a schematic diagram of a control system 400 in accordance with the present disclosure is provided. The control scheme 400 generally includes a controller 402, which may be an engine controller. The controller 402 is operable with the air cooling system/reverse bleed system for controlling operation of the system and receiving data from the system engine and engine including the system.

The control scheme 400 further includes a configuration block 404, whereby the controller 402 may confirm the air cooling system/reverse bleed system is installed. The configuration block 404 may check that a specific wiring harness is connected and that the correct software is installed.

The control scheme 400 further includes at block 406 an output data processing block, whereby the controller 402 may communicate data with, e.g., the aircraft controller, and at block 408 a communication protocols block, providing communication protocols between the engine controller and, e.g., the aircraft controller.

Further, the control scheme 400 includes at block 410 a menu mode block, allowing for manual operation of the air cooling system/reverse bleed system in response to, e.g., one or more user inputs. The menu mode block may allow for maintenance operations of the air cooling system/reverse bleed system, operability checks of the air cooling system/reverse bleed system, etc.

Further, the control scheme 400 includes at block 412 an air cooling system/reverse bleed system fault monitoring and processing block. The block 412 may allow for the storing and processing of additional information that may indicate non-operation of the air cooling system/reverse bleed system. The block 412 may incorporate some persistence, such that multiple failures must be indicated before repair or replacement of the air cooling system/reverse bleed system is requested.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method for operating a gas turbine engine including: determining data indicative of an operation of a cooling system of the gas turbine engine during a shutdown of the gas turbine engine, following the shutdown of the gas turbine engine, or both; and modifying a startup schedule of the gas turbine engine in response to the determined data indicative of the operation of the cooling system of the gas turbine engine.

The method of one or more of these clauses, wherein the cooling system provides a flow of cooling air to a component of the gas turbine engine configured to contain fuel.

The method of one or more of these clauses, wherein the cooling system is a reverse bleed system configured to provide a flow of air over a component of a combustor of the gas turbine engine during operation of the reverse bleed system.

The method of one or more of these clauses, wherein the cooling system comprises a blower positioned within an undercowl location of the gas turbine engine.

The method of one or more of these clauses, wherein the blower is configured to provide the flow of air from the undercowl location of the gas turbine engine, or from a bypass valve.

The method of one or more of these clauses, wherein the cooling system defines an inlet exposed to the undercowl location of the gas turbine engine.

The method of one or more of these clauses, wherein the cooling system is configured to provide a flow of air through a compressor bleed port using a blower located internal to a cowl of the gas turbine engine.

The method of one or more of these clauses, wherein modifying the startup schedule of the gas turbine engine comprises reducing a motoring time of the gas turbine engine.

The method of one or more of these clauses, wherein the data determined indicative of the operation of the cooling system comprises data indicative of the cooling system operating properly.

The method of one or more of these clauses, further comprising: initiating operation of the cooling system following the shutdown of the gas turbine engine, and wherein the data determined indicative of the operation of the cooling system comprises data indicative of an engine temperature at a first time after operation of the cooling system has been initiated and data indicative of the engine temperature at a second time, wherein the second time is after the first time.

The method of one or more of these clauses, wherein the data determined indicative of the operation of the cooling system further comprises data indicative of a difference between the engine temperature at the first time and at the second time.

The method of one or more of these clauses, further comprising: determining data indicative of a soakback temperature indicator parameter; and initiating operation of the cooling system following the shutdown of the gas turbine engine in response to the data indicative of the soakback temperature indicator parameter.

The method of one or more of these clauses, further comprising: determining data indicative of an engine operating parameter; and initiating operation of the cooling system following the shutdown of the gas turbine engine in response to the data indicative of the engine operating parameter.

The method of one or more of these clauses, further comprising: initiating operation of the cooling system following the shutdown of the gas turbine engine; and operating the cooling system for a predetermined amount of time.

The method of one or more of these clauses, wherein operating the cooling system for a predetermined amount of time comprises powering the cooling system with a power source external to the gas turbine engine.

The method of one or more of these clauses, further comprising: initiating operation of the cooling system following the shutdown of the gas turbine engine; shutting down an engine controller of the gas turbine engine after a first amount of time following the shutdown of the gas turbine engine; and operating the cooling system for a second amount of time following the shutdown of the gas turbine engine, wherein the second amount of time is greater than the first amount of time.

The method of one or more of these clauses, further comprising: initiating operation of the cooling system following the shutdown of the gas turbine engine; and operating the cooling system, wherein operating the cooling system comprises providing a flow of cooling air through a high pressure compressor of the gas turbine engine, a combustion section of the gas turbine engine, or both.

A method for operating a gas turbine engine comprising: receiving data indicative of a soakback temperature indicator parameter; initiating operation of a cooling system of the gas turbine engine during a shutdown of the gas turbine engine, following the shutdown of the gas turbine engine, or both in response to the received data indicative of the soakback temperature indicator parameter; and operating the cooling system to provide a flow of cooling air through a high pressure compressor of the gas turbine engine, a combustion section of the gas turbine engine, or both.

The method of one or more of these clauses, wherein the data indicative of the soakback temperature indicator parameter comprises data indicative of an ambient condition, data indicative of an engine temperature parameter, or both.

The method of one or more of these clauses, wherein operating the cooling system comprises operating the cooling system for an amount of time determined based at least in part on the soakback temperature indicator parameter.

An aeronautical system comprising: a gas turbine engine comprising a compressor section, a combustion section and a turbine section arranged in serial flow order, the gas turbine engine further comprising a cooling system in selective airflow communication with the compressor section, the combustion section, or both; and a control system in operable communication with the cooling system, the control system configured to: determine data indicative of an operation of the cooling system of the gas turbine engine during a shutdown of the gas turbine engine, following the shutdown of the gas turbine engine, or both; and modify a startup schedule of the gas turbine engine in response to the determined data indicative of the operation of the cooling system of the gas turbine engine.

The aeronautical system of one or more of these clauses, wherein the cooling system provides a flow of cooling air to a component of the gas turbine engine configured to contain fuel.

The aeronautical system of one or more of these clauses, wherein the cooling system is a reverse bleed system configured to provide a flow of air over a component of a combustor of the gas turbine engine during operation of the reverse bleed system.

The aeronautical system of one or more of these clauses, wherein modifying the startup schedule of the gas turbine engine comprises reducing a motoring time of the gas turbine engine.

The aeronautical system of one or more of these clauses, wherein the data determined indicative of the operation of the cooling system comprises data indicative of the cooling system operating properly.

The aeronautical system of one or more of these clauses, wherein the controller is further configured to initiate operation of the cooling system following the shutdown of the gas turbine engine, and wherein the data determined indicative of the operation of the cooling system comprises data indicative of an engine temperature at a first time after operation of the cooling system has been initiated and data indicative of the engine temperature at a second time, wherein the second time is after the first time.

A controller for a gas turbine engine, the controller comprising one or more processors and memory, the memory storing instructions that when executed by the one or more processors cause the gas turbine engine to: determine data indicative of an operation of a cooling system of the gas turbine engine during a shutdown of the gas turbine engine, following the shutdown of the gas turbine engine, or both; and modify a startup schedule of the gas turbine engine in response to the determined data indicative of the operation of the cooling system of the gas turbine engine.

We claim:

1. A gas turbine engine, comprising:
   a core cowl,
   a core contained within the core cowl, including a compressor in fluid communication with a downstream combustor and a downstream turbine, the compressor including a compressor bleed port, wherein an undercowl space is defined between the core cowl and the core;
   a cooling duct disposed at least partially in the undercowl space and having an inlet and an outlet, wherein the cooling duct is in fluid communication with a source of cooling air and is further in fluid communication with the compressor bleed port;
   a valve assembly including at least one valve disposed in the cooling duct; and
   a cooling blower disposed within the engine and operable to move an air flow from the inlet of the cooling duct towards the outlet of the cooling duct and through the compressor bleed port.

2. The engine of claim 1, wherein the inlet of the cooling duct is in fluid communication with the source of cooling air, and wherein the outlet of the cooling duct is in fluid communication with the compressor bleed port.

3. The engine of claim 2, wherein the inlet of the cooling duct is in fluid communication with the undercowl space.

4. The engine of claim 2, wherein a bypass duct is disposed upstream of the compressor, and the inlet of the cooling duct is in fluid communication with the bypass duct.

5. The engine of claim 1, further including a bleed duct coupled to the compressor bleed port, wherein the outlet of the cooling duct is coupled to the bleed duct.

6. The engine of claim 1, wherein the valve assembly includes a first valve and a second valve in series fluid communication, the first valve being closer to the outlet of the cooling duct.

7. The engine of claim 6, wherein at least one of the valves is a check valve.

8. The engine of claim 6, wherein at least one of the valves is a fluid-pressure-responsive passive valve.

9. The engine of claim 6, wherein the first valve is a check valve and the second valve is a controllable valve.

10. The engine of claim 1, wherein the cooling blower is at least partially disposed within the cooling duct.

11. The engine of claim 1, wherein the cooling blower is electrically powered.

12. A cooling duct assembly for a gas turbine engine, the gas turbine engine comprising a core cowl and a core contained within the core cowl, the core including a compressor having a compressor bleed port, the gas turbine engine defining an undercowl space between the core cowl and the core, the cooling duct assembly comprising:
    a cooling duct configured to be disposed at least partially in the undercowl space and having an inlet and an outlet, wherein the cooling duct is configured to be in fluid communication with a source of cooling air and the compressor bleed port when installed in the gas turbine engine;
    a valve assembly including at least one valve disposed in the cooling duct; and
    a cooling blower disposed operable to move an air flow through the cooling duct to provide an airflow through the compressor bleed port when installed in the gas turbine engine and during operation.

13. The cooling duct assembly of claim 12, wherein the inlet of the cooling duct is configured to be in fluid communication with the source of cooling air, and wherein the outlet of the cooling duct is configured to be in fluid communication with the compressor bleed port.

14. The cooling duct assembly of claim 13, wherein the inlet of the cooling duct is configured to be in fluid communication with the undercowl space.

15. The cooling duct assembly of claim 12, wherein the gas turbine engine further includes a bleed duct coupled to the compressor bleed port, wherein the outlet of the cooling duct is configured to be coupled to the bleed duct.

16. The cooling duct assembly of claim 12, wherein the valve assembly includes a first valve and a second valve in series fluid communication, the first valve being closer to the outlet of the cooling duct.

17. The cooling duct assembly of claim 16, wherein at least one of the valves is a check valve.

18. The cooling duct assembly of claim 16, wherein at least one of the valves is a fluid-pressure-responsive passive valve.

19. The cooling duct assembly of claim 16, wherein the first valve is a check valve and the second valve is a controllable valve.

20. The cooling duct assembly of claim 12, wherein the cooling blower is at least partially disposed within the cooling duct.

* * * * *